United States Patent [19]
Garron

[11] 4,005,664
[45] Feb. 1, 1977

[54] SEWING MACHINE PATTERN SELECTION SYSTEM

[75] Inventor: Stephen Alexander Garron, Elizabeth, N.J.

[73] Assignee: The Singer Company, New York, N.Y.

[22] Filed: Sept. 17, 1975

[21] Appl. No.: 614,288

[52] U.S. Cl. .............................. 112/158 E
[51] Int. Cl.[2] .......................... D05B 3/02
[58] Field of Search ....... 112/158 E, 158 C, 158 R, 112/121.11, 121.12; 235/151.11, 92 BD; 58/23 R; 66/50 R, 154 A

[56] References Cited

UNITED STATES PATENTS

| | | | |
|---|---|---|---|
| 3,465,298 | 9/1969 | Duke et al. | 235/151.11 X |
| 3,699,763 | 10/1972 | Zeph | 58/23 R |
| 3,855,780 | 12/1974 | Kashio | 58/23 R |
| 3,872,808 | 3/1975 | Wurst | 112/158 E |
| 3,909,801 | 9/1975 | Tokura et al. | 235/151.11 |

Primary Examiner—Werner H. Schroeder
Assistant Examiner—Peter Nerbun
Attorney, Agent, or Firm—Edward L. Bell; Robert E. Smith; Julain Falk

[57] ABSTRACT

A pattern selection system for a sewing machine is provided by which operator influenced closure of a single electric switch can effect the selection of any one of a multiplicity of stitch patterns stored in an electronic memory in the sewing machine. Pattern selection can be effected either by repeated closure of the single switch, by a scanning system rendered effective by continuous closure of the single switch, or by a combination of both of these modes. This system is compatible with the provision of additional individual pattern selection switches for selecting special or frequently utilized individual patterns.

9 Claims, 5 Drawing Figures

SEWING MACHINE PATTERN SELECTION SYSTEM

BACKGROUND OF THE INVENTION

In sewing machines which derive information for the formation of patterns of stitches from data stored in an electronic memory, the large quantity of stitch pattern information which can be stored facilitates the provision of large numbers of different stitch patterns but presents the problem of operator access. There exists on the exterior surface of the sewing machine such a limited space for operator controls that the limitation of the number of different patterns that may be effectively stored is imposed by the difficulty of providing a selection means.

The problem is further compounded by the fact that it is desirable to display on the sewing machine frame indicia representative of each of the stitch patterns which is available and to particularly distinguish that one of the represented stitch patterns which is effective at any given time.

The prior U.S. patent application Ser. No. 527,314 filed Nov. 26, 1974 discloses a pattern selection system which provides an individual electric push button switch for effecting the selection of each individual stitch pattern available in the electronic memory. This referenced U.S. Patent Application provides an arrangement which enables a row of individual push button switches selectively to render effective any one of different sets of stitch patterns thus to increase the number of different stitch patterns which may be selected utilizing an array of push buttons less than the total number of available stitch patterns. This referenced prior U.S. patent application, however, requires an array of selector push buttons with a minimum spacing on the sewing machine such that an operator's finger may selectively operate any desired one.

SUMMARY OF THIS INVENTION

It is an object of this invention to provide a stitch pattern selector system for a sewing machine in which a single operator influenced switch can serve to influence the selection of the entire array of stitch patterns stored in the electronic memory of the sewing machine. With the present invention, the indicia corresponding to the various possible stitch patterns, since they need not be manipulated, may be displayed in a concentration which is more dense than would be possible by individual operator influenced push buttons and, therefore, a more compact arrangement of such indicia is possible or conversely a greater total number of different stitch patterns may be displayed. This object of the invention is attained by the provision in the pattern selection system of a pattern selector counter which reacts to sequential closure of the single selector switch to identify in sequence each of the different stitch patterns stored in the electronic memory in the sewing machine.

It is another object of this invention to provide a stitch pattern selector system of the above character in which continuous closure of the single pattern selector switch activates a clock pulse generator which automatically indexes the pattern selector counter to scan in sequence the different stitch patterns which are stored in the electronic memory of the sewing machine.

This invention comprehends the combination of the foregoing arrangements, and is compatible with the provision on the sewing machine of one or more operational operator influenced switches for influencing the selection of special or frequently utilized stitch patterns such as a straight stitch pattern.

DESCRIPTION OF THE DRAWINGS

With the above and additional objects and advantages in view as hereinafter will appear, a preferred embodiment of this invention is illustrated in the accompanying drawings in which.

DESCRIPTION OF THE PREFERRED EMBODIMENT

This invention is adapted to be applied to any sewing machine having an ornamental stitch pattern system operating in response to electronic pattern information signals. The U.S. Pat. No. 3,872,808 dated Mar. 25, 1975 of J. W. Wurst, which discloses one sewing machine of this type, is incorporated herein by reference.

The above referenced U.S. Pat. No. 3,872,808 includes a static electronic memory capable of storing a multiplicity of different stitch pattern dictating instructions of which the stored information corresponding to any selected stitch pattern may be retrieved by way of an address memory 91 as described therein. The present invention may be used with the data storage and retrieval system of the referenced U.S. Pat. No. 3,872,808 and may be substituted for the pattern selector means 90 of that referenced patent. Comparison of the disclosure of the referenced patent with that of the present invention may aid in an understanding of the present invention.

Figure 1:
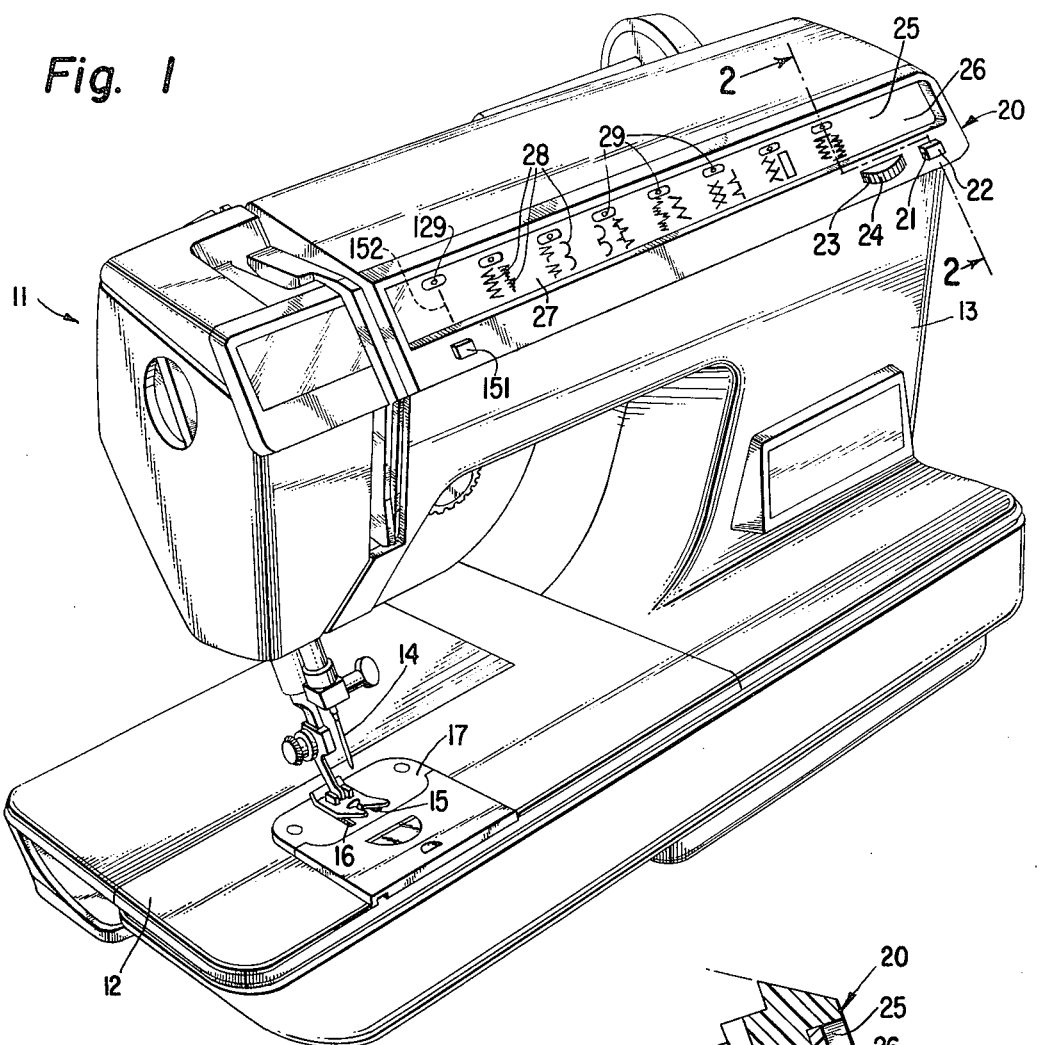
FIG. 1 is a perspective view of a sewing machine having the pattern selection system of this invention applied thereto.

FIG. 1 of the accompanying drawings illustrates a sewing machine 11 with a frame including a work supporting bed 12 and a bracket arm 13 overhanging the bed. Stitch forming instrumentalities carried in the frame include a needle 14 capable of being reciprocated and jogging laterally to form zig-zag stitches and a work feeddog 15 operating upwardly through slots 16 formed in a throat plate 17 on the bed 12 to transport work across the bed between successive stitches.

In the above identified U.S. Pat. No. 3,872,808 incorporated herein by reference, information is retrieved for controlling both the jogging of the needle 14 and/or the direction and magnitude of feed motion of the work feeddog 15 in response to electronic stitch pattern data to influence the stitch position coordinates for the production of stitch patterns. In the above referenced patent four selector buttons are each capable of selecting only one given pattern. In the U.S. pat. application, Ser. No. 527,314 filed Nov. 11, 1974 assigned to a common Assignee which is also incorporated herein by reference, a pattern selection system is disclosed providing for the selection of 25 different patterns of stitches using only seven push buttons and a selector switch. The above referenced patent application, Ser. No. 527,314, also discloses the structural details of an electric switch construction which may be utilized in carrying out the present invention as well as an arrangement for selectively energizing light emitting diodes for identifying the selected stitch pattern from among the representations of all of the available stitch patterns which are continuously displayed on the sewing machine frame.

For an understanding of the present invention, referring to FIG. 1, of the accompanying drawings, the bracket arm 13 of the sewing machine is provided with an escutcheon member 20 formed with an aperture 21 through which projects a push button 22, actuation of which in accordance with this invention can influence the selection of any one of a multiplicity of patterns stored in the electronic memory in the sewing machine. Adjacent to the push button 22, the escutcheon plate is formed with a slot 23 accommodating the periphery of a dial 24 which protrudes there through operator manipulation.

Above the push button 22 and the dial 24, the escutcheon member is formed with a window 25 exposing to the operator a display panel in which may be exhibited representations of all the stitch patterns which are available in the electronic memory stored within the sewing machine. The window 25 is fitted with a transparent cover plate 26 behind which is constrained a lengthwise shiftable display panel 27 on which indicia 28 representative of the stitch patterns which may be selected are carried. The dial 24 is operatively associated with the display panel 25 and serves to influence lengthwise shifting thereof when the dial is turned. As shown in FIG. 1 indicia 28 are arranged in pairs each pair being disposed beneath one of a series of light emitting diodes 29 carried by the escutcheon behind the transparent cover plate 26.

Figure 3:
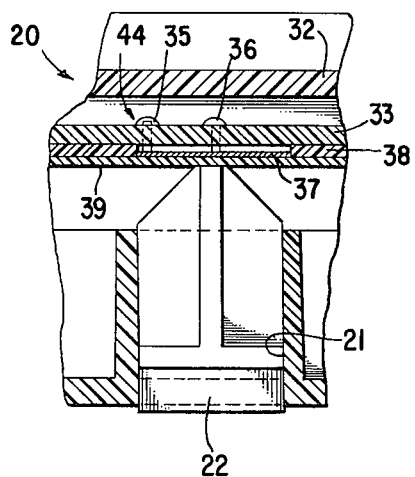
FIG. 3 is a longitudinal cross-sectional view through the pattern selection switch taken substantially along line 3—3 of FIG. 2.
Figure 2:
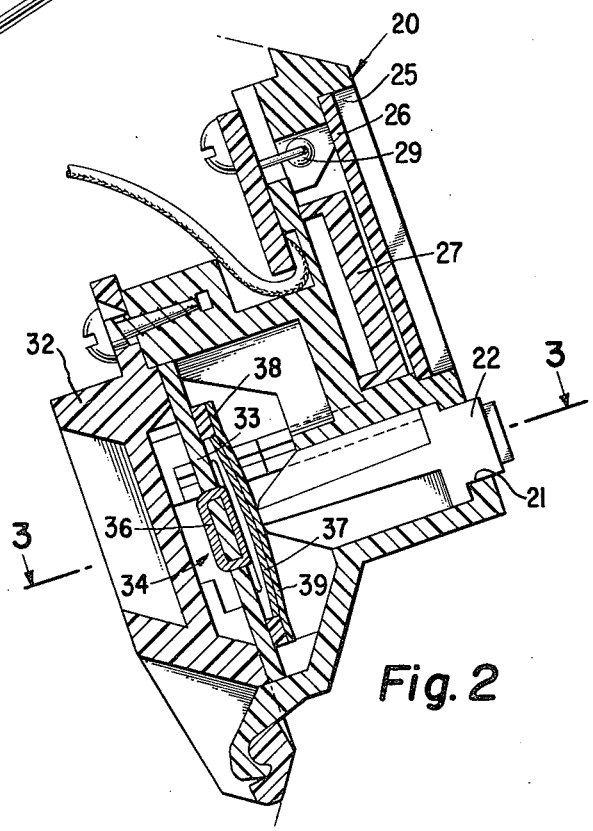
FIG. 2 is an enlarged transverse cross-sectional view taken substantially along line 2—2 of FIG. 1 showing the pattern selection switch on the sewing machine.
Figure 5:
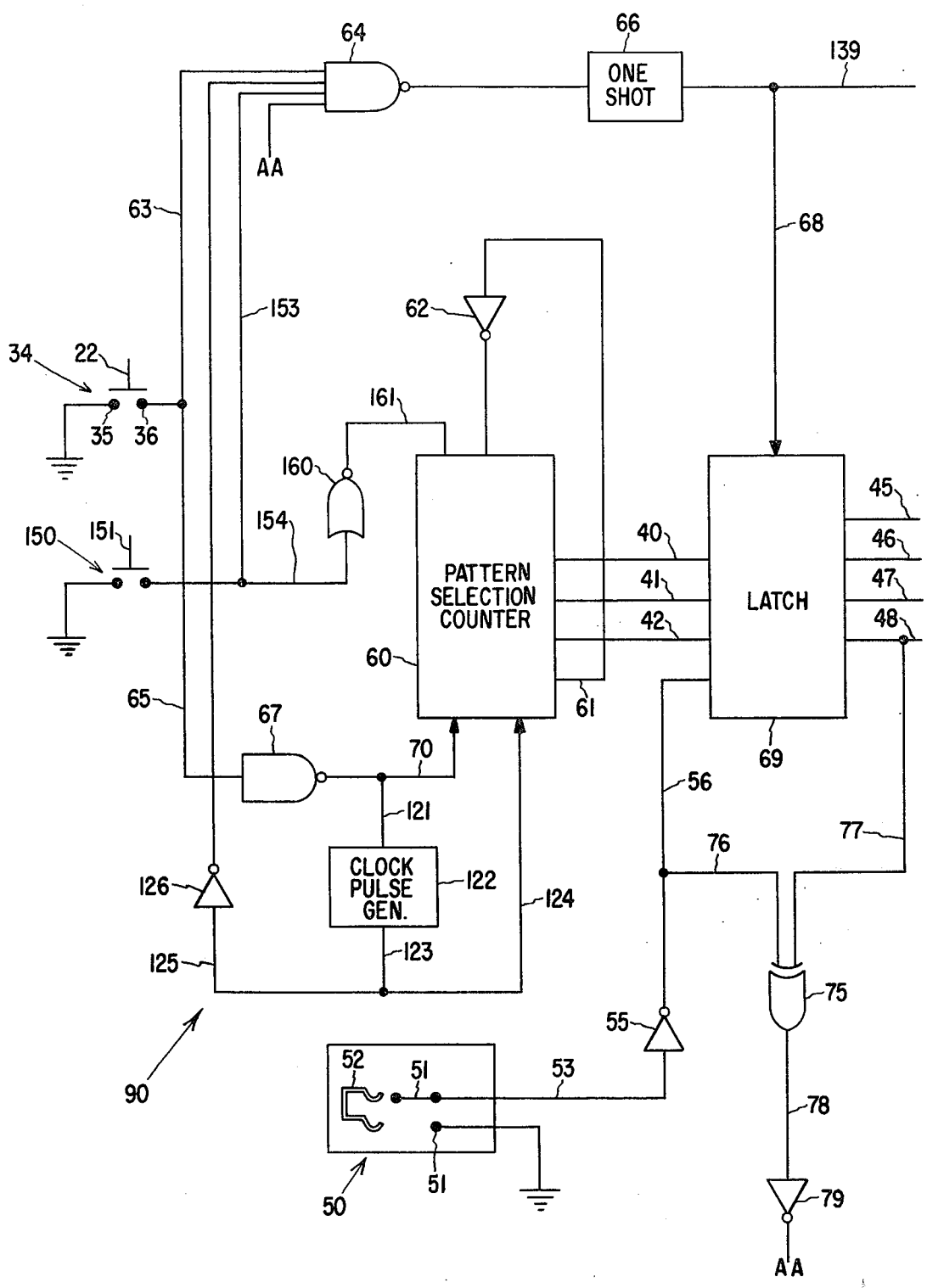
FIG. 5 is a functional block diagram showing a modified form of the stitch pattern selection system in accordance with this invention in which either repeated closure of a single operator influenced pattern selector switch or continuous closure of that switch will effect sequential selection of the available stitch patterns stored in the electronic memory of the sewing machine, as well as the provision of a special pattern selector switch for influencing the selection of one frequently utilized stitch pattern.

As best shown in FIGS. 2 and 3, a closure member 32 is secured to the back of the escutcheon member 20 and a switch base plate 33 is constrained therebetween. Carried on the switch base plate in alignment with the push button 22 is an electric switch 34 preferably comprising a pair of contacts 35 and 36 extending through the base plate and covered by a dished shaped electric conducting resilient disc 37. The disc is mounted on a support strip 38 arranged to abut the base plate. The rim of the disc is constrained in engagement with the contact 35 but when uninfluenced by depression of the button 22, the disc 37 remains bowed and out of engagement at the center with the contact 36 as shown in FIG. 2; a sheet of flexible insulating material 39 made of plastic or the like may be arranged between the disc 37 and the push button 22. When depressed by contact by the button 22, the disc 37 snaps into a position closing an electrically conductive path between the contacts 35 and 36 as shown in FIG. 3. Preferably one of the contacts 35 is connected to ground as indicated in FIG. 5 while the other contact 36 is connected by leads 63, 65 to the pattern selecting system which will now be described.

Figure 4:
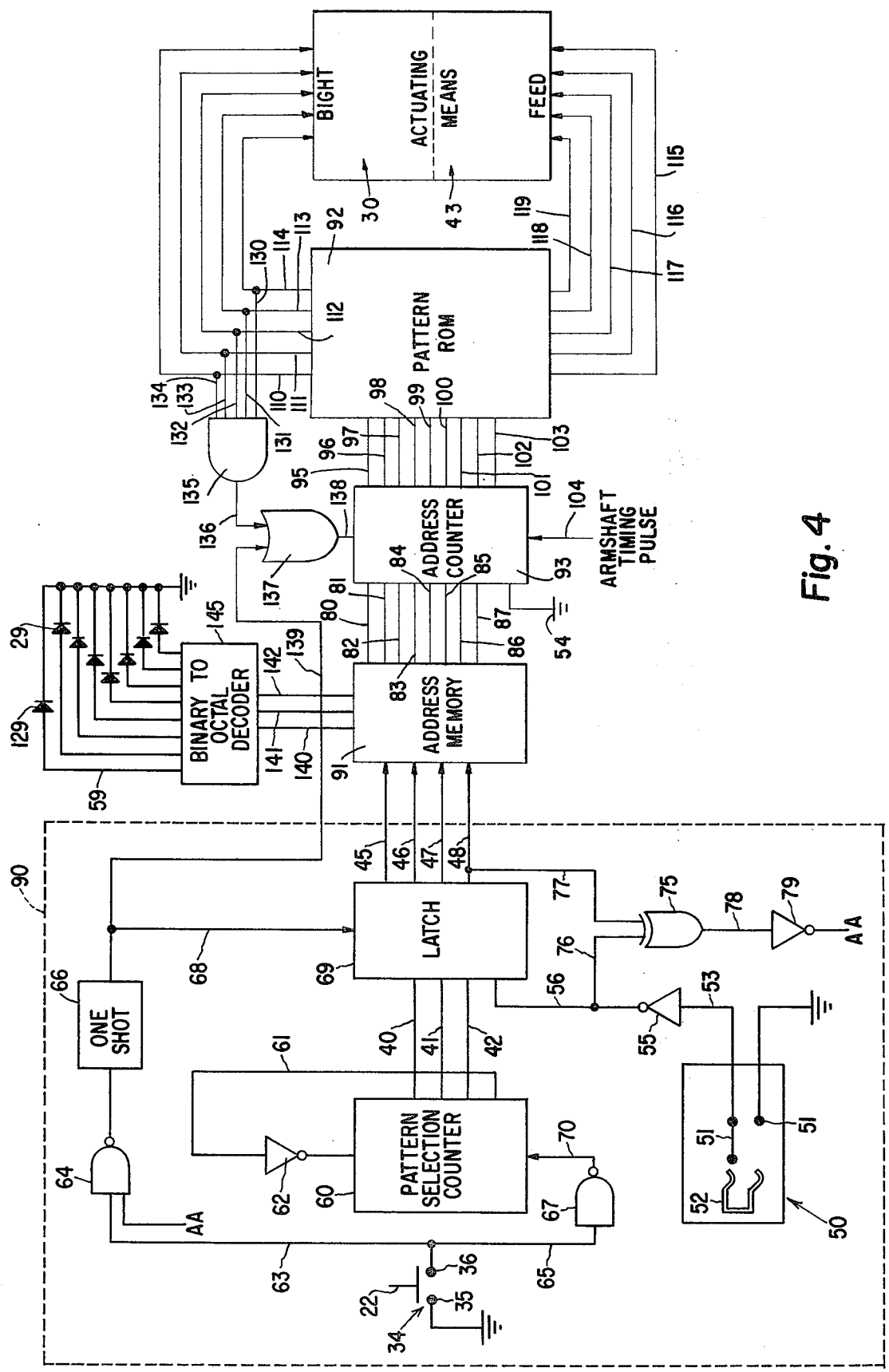
FIG. 4 is a functional block diagram showing the stitch pattern selector system of this invention in a form requiring repeated closure of the single operator influenced switch in order to effect selection of a stitch pattern as applied to a complete system for influencing stitch position coordinates.

Referring to FIG. 4, an embodiment of the present invention will now be described in which pattern selection is influenced by repeated closure of the electric switch 34 by depression of the push button 22. In FIG. 4, that portion of the functional block diagram which is contained within the dashed line indicated at 90, represents the portion devoted to pattern selection while the remainder of the diagram shown in FIG. 4 discloses a system for storing a multiplicity of patterns and which influences stitch position coordinates of the sewing machine in response to any selected one of these patterns. As shown in the pattern selection portion 90 of FIG. 4, a latch 69 is embodied which may be a conventional commercially obtainable integrated circuit module of the same type described in the referenced U.S. Pat. No. 3,872,808 and identified therein by the reference character 69. Four input lines 40, 41, 42 and 56 are illustrated leading to the latch 69 and four output lines 45, 46, 47 and 48 are illustrated leading therefrom. Preferably the signals appearing on the input and output lines from the latch will be arranged in a binary sequence and a one shot multi-vibrator 66 is arranged to provide a signal in the line 68 to operate the latch i.e. to provide a continuous output on output lines 45 through 48 of the latch corresponding to whatever input signal is applied to the latch on input lines 40, 41, 42 and 56.

Indicated at 50 in FIG. 4 is a slide switch of the type described in considerable detail in the referenced U.S. patent application Ser. No. 527,314 incorporated herein by reference and identified therein by the reference character 63. The slide switch 50 of the present disclosure differs in that it includes contact strips 51 movable relatively to a brush 52 under the influence of the dial 24 which provide only for at will influencing the presence of a low or off signal in the input line 53 to the inverter 55. The inverter will provide an on or high signal in the line 56 to the latch 69. Preferably the input line 56 to the latch 69 provides the significance in the binary code sequence, equivalent to 8 to the base 10, while input lines 40, 41, and 42 would have the significance of 1, 2 and 4 respectively to the base 10.

The input lines 40, 41 and 42 to the latch are directed from a pattern selection counter 60. Preferably the counter 60 in the preferred embodiment is solid state and is capable of counting through more than 8 stations and includes an output line 61 which is rendered conductive when the number counted reaches 8 to the base 10. The line 61 is directed to an inverter 62 of which the output is connected to load the counter 60 in a condition in which the counter outputs a binary count equivalent to 1 to the base 10, i.e. with only line 40 conductive.

As shown in FIG. 4, the pattern selector switch 34 has its contact 36 connected electrically by a line 63 to the input of a NAND Gate 64 of which the output is directed to the one shot multi-vibrator 66. The pattern selector switch 34 also has the contact 36 electrically connected by a line 65 to the input of a NAND Gate 67 of which the output line 70 is directed so as to pulse the pattern selection counter 60. It will be understood that a source of rectified signal voltage (not shown) is operatively connected to the conductors leading from the pattern selector switch contact 36, that when the push button 22 is depressed so that the switch 34 is closed, this source of signal voltage in lines 63 and 65 will be diminished by the connection to the ground through switch contact 35. As a result, the input to both NAND gates 64 and 67 will drop substantially to 0 and the output from these NAND gates will be in an On or conductive state causing an index of the counter and an operation of the latch 69 by way of the one shot multivibrator 66. The NAND gate 64 may also be influenced to operate the latch 69 by way of the one shot multivibrator 66 by change of the condition of the slide switch 50. For this purpose an EXCLUSIVE OR gate 75 is provided having one input line 76 connected to the input line 56 of the latch 69 and the other input line 77 connected to the latch output line 48. As is known in the art, the EXCLUSIVE OR gate 75 functions as a comparator to provide an On or high value in output line 78 in response to any difference existing in the input lines. An inverter 79 responsive to the output line 78 imposes a low or 0 state on the line A—A directed to the input of NAND gate 64.

The power for operation of the pattern selection as well as the data retrieval arrangement and the actuating means for both bight and feed may be derived from usual house current which is converted to an appropriate DC voltage in a conventional manner for use, for instance, by the integrated circuit modules 91, 92 and 93 and such conversion means may include the use of a transformer and rectifiers (not shown). The pattern selection means 90 described above serves to provide a binary code on lines 45, 46, 47 and 48 which are directed to the input of an address memory 91 which provides on output lines 80 through 87 a code word delineating the address in the pattern ROM 92 of the first stitch in the pattern selected. The address memory 91 may be purchased commercially from Signetics Corp. as Model No. 8223 and is programmed in a conventional manner to obtain the required code.

The address counter 93 has connected thereto the input lines 80 through 87 from the address memory 91 which determines the starting point of the counter. The address counter 93 has a count-up input line 104 which provides pulses from a pulse generator (not shown). Output lines 95, 96, 97, 99, 100, 102 and 103 are connected to the inputs of the pattern read only memory (ROM) 92. The read only memory is implemented by a Signetics Model No. 82S26 logic integrated circuit which is a conventional ROM having the output lines 110, 111, 112, 113 and 114 which provide the digital code word for the bight actuating means 30 and the lines 115, 116, 117, 118 and 119 which provide the digital code word for the feed actuating means 43. The bight actuating means 30 and the feed actuating means 43 may be similar in construction and may take any known form adapted to convert a digital code word into a mechanical position which locates the sewing machine needle in a conventional stitch forming instrumentality and provides a specific work feed step between successive needle penetrations. It will be understood that when actuating means is referred to it incorporates both the bight and feed actuating means 30 and 43 hereafter, and may include a latching means, not shown, if required. As will be apparent the encoding of the digital code word is such that an actuating means operatively connected to the stitch forming instrumentality of the sewing machine and controlled by the pattern ROM 92 establishes the coordinates for the needle penetration of each stitch in accordance with the predetermined pattern selected. One such driving device which may be used in the system of this invention is the whippletree actuator shown and described in U.S. Pat. of Davidson, No. 3,881,433. Reference may be made to this Patent for a more complete understanding of the operation of an actuating means suitable for use with this invention.

Additionally included in the pattern ROM 92 are end indicating words which denote the end of each selected pattern. In the preferred embodiment of the invention the end indicating code word was chosen to be 11111. When this binary digital code is coupled, via lines 130, 131, 132, 133 and 134 to the input of AND gate 135 an output is provided from AND gate 135 which is connected, via line 136 to OR gate 137. The output of OR gate 137 is connected to the reset or load input of address counter 93, via line 138. Thus, the address counter will be reset each time the end word code is generated by the pattern ROM. An additional input to OR gate 137 is obtained from the output of one shot 66 and is connected, via lead 139, and provides for resetting the address counter 93 each time any ornamental stitch pattern or straight stitch is selected by the operator.

The address memory 91 is permanently encoded in a conventional manner so that any binary number presented on its address lines 45, 46, 47 and 48 will produce a predetermined specific binary number on output data lines 80 through 87 which is representative of the particular pattern selected. The address counter, in response to a pulse on line 138, is loaded with the binary number presented on the input lines 80 through 87 including the zero bit supplied by ground 54 and will count up from that number in response to timing pulses on the count-up input line 104, the result appearing on output data lines 95–103. It is to be noted that the address memory provides only the address of the first code word of a stitch pattern which represents the first needle penetration of that pattern and remains latched in that condition until a different pattern is selected. An input pulse occuring via line 104 causes the counter to move up one count for each pulse, thereby causing the next successive code word to appear on lines 95–103. This causes an output from the pattern ROM 92 to appear on output data lines 110–114 for each successive needle penetration and provides an output on lines 115 through 119 which is utilized by the feed actuating means in between each needle penetration.

In operation, the embodiment illustrated in FIG. 4 requires repeated closure of the switch 34 by depression of the push button 22 to influence successive pattern selection. As a result of each closure of the switch 34, the pattern selection counter 60 will be indexed to the next binary number standing on the output lines 40, 41, 42 and 56 and simultaneously with each counter index the multi-vibrator 66 will operate the latch 69 to hold the new number applied thereto. The line 56 applied as an input to the latch will be uninfluenced by the operation of the counter 60 but will either apply or not apply the significance of 8 to the base 10 to the resulting binary coded input of the latch. The latch 69 will thus hold in sequence the numbers 1 to 7 inclusive or the numbers 9 through 15 inclusive and the pattern selection counter will automatically be loaded to output the number 1 to 9 by the inverter 62. Operator influence of a single electric switch 34, therefore can, as illustrated in FIG. 4, provide selectively for any one out of 14 different stitch patterns to be effective. It will will be appreciated that this number has been arbitrarily selected in the accompanying disclosure and that any desired number of different patterns may simultaneously be provided for selection by the arrangement of this invention.

In FIG. 5 there is illustrated an embodiment which is a modification of that illustrated in FIG. 4 to provide in addition to pattern selection upon repeated closure of the pattern selecting switch 34, a scanning of the available stitch patterns automatically when the electric pattern selecting switch 34 is held continuously closed. In FIGS. 4 and 5 like elements have like reference characters applied thereto and it will be appreciated that the entire system disclosed in FIG. 4 is included in FIG. 5 so that the system disclosed in FIG. 5 will operate exactly as does the system illustrated in FIG. 4 if momentary closure of the pattern selector switch 34 is repeatedly effected in order to influence each successive pattern selection. The output line 70 from the NAND Gate 67 to the pattern selection counter 60 in FIG. 5, however, is connected by a lead 121 to a clock pulse generator 122 which may be of any known construction and, for instance, may be purchased commercially from Signetics Corporation as Model 555 timer, and which operates in response to a signal in line 121 to provide in an output line 123 a periodic conductive pulse, such pulse occurring at predetermined timed intervals. The clock pulse generator output line 123 is connected electrically to a line 124 which is directed so as to index the pattern selection counter 60 and the output line 123 of the clock pulse generator is also connected by a line 125 to an inverter 126 and thence to the NAND Gate 64 by which the one shot multivibrator 66 will be pulsed to operate the latch 69 for each counted position of the pattern selection counter 60. With this arrangement, pattern selection by operator influence of the switch 34 can be effected either by repeated closure of the switch 34, by continuous closure of the switch 34 and operation of the clock pulse generator 122, or by any combination of both of these modes.

Also included in FIG. 5 is a representation of a second pattern selection switch 150. As indicated in FIG. 1, the second pattern selection switch 150 includes a push button 151 which is located to one side of the entire array of indicia for ornamental stitch pattern indication on the display panel 27. Adjacent the switch 150 and preferably within the window 25 above the push button 151 associated with the switch 150, is arranged a light emitting diode 129 and a representation 152 of a particular stitch pattern such as a straight stitch pattern on a fixed portion of the escutcheon plate 20, that is not on the shiftable display panel 27. The switch 150 may be constructed exactly after the fashion of the switch 34 as shown in FIGS. 2 and 3. However, as indicated in FIG. 5, the switch 150 serves to connect to ground a lead 153 which is directed to the NAND gate 64 to influence operation of the latch 69 and is also connected by a lead 154 to a NOR gate 160 of which the output 161 is connected to clear the pattern selection counter, i.e. to cause all of the counter outputs 41, 42 and 61 to assume an off or 0 state. The latch 69 is operated by the one shot 66 to hold this condition in which there is no signal passed by the lines 40, 41, and 42. Depending upon the condition of the line 51, the latch, therefore, will hold on output lines 45 to 48 a binary number corresponding either to the number 0 or the number 8 to the base 10. In the address memory to which the lines 45 to 48 are applied, whichever pattern address is stored in the locations 0 and 8 will therefore be called into operation. As indicated by the indicia on FIG. 1, the preferred embodiment contemplates that a straight stitch pattern will be programmed at these locations. It will be appreciated however, that any other desired pattern might be arranged to be effective under these conditions. It will also be apparent that by a similar arrangement any number of separate individual pattern selector switches may be utilized and are compatible with the pattern selection arrangement of this invention for providing the selection of special or frequently utilized stitch patterns.

Lines 140, 141 and 142 leading from the address memory 91 reflect the condition of input lines 45, 46 and 47 and are directed to a binary to octal decoder 145 for influencing a continuous signal in a selected one of the lines 59 which lead to the light emitting diode 129 delineating straight stitch and to the light emitting diodes 29 for delineating the ornamental stitch pattern. When any particular pattern is selected, therefore, by manipulation of the switch 34, that light emitting diode 129 or 29 which is arranged vertically above the indicia representative of the selected pattern, will be operated to identify which one of the available patterns have been selected.

Having set forth the nature of this invention, what is claimed herein is:

1. A multiple pattern sewing machine having instrumentalities for forming a succession of stitches individually placed in a selected one of a plurality of different patterns, said sewing machine including a static pattern memory means in which a multiplicity of separate digitally coded words are stored in a predetermined sequence with each word corresponding to one individually placed stitch in a pattern, an address memory means in which separate signals are stored in a numerical sequence each addressing the starting code word address in said static pattern memory means for a different one of said plurality of patterns, means for providing timing pulses related to the formation of successive stitches by said sewing machine, means utilizing said timing pulses for addressing digital code words in said static pattern memory means in said predetermined sequence beginning with said starting word identified by an address memory signal, means effective automatically to return to said starting word identified by said address memory signals to repeat said predetermined sequence, and actuating means responsive to said predetermined sequence of digitially coded words and operatively connected to said stitch forming instrumentalities for influencing said stitch forming instrumentalities to form a selected pattern in response thereto, the improvement which comprises a pattern selection means rendered effective by manipulation of a single operator influenced pattern selector switch means for selecting any one of said pluralities of different patterns, said pattern selection means comprising:
  a. a pattern selector switch means accessible to a sewing machine operator on said sewing machine,
  b. a pattern selection counter arranged to deliver as an output to said address memory means a predetermined numerical sequence including at least a portion of that in which said separate signals are stored in said address memory, and
  c. means effective in response to actuation of said pattern selector switch means for indexing said pattern selection counter through said predetermined numerical sequence.

2. A pattern selection means for a multiple pattern sewing machine as set forth in claim 1 in which a loading means is operatively associated with said pattern address counter effective to reset said pattern address counter to output an initial value within said predetermined numerical sequence, and means responsive to the output from said pattern address counter of a predetermined final value beyond said numerical sequence for operating said loading means.

3. A pattern selection means for a multiple pattern sewing machine as set forth in claim 2 including a second pattern selector switch means on said sewing machine, means rendered effective upon closure of said second pattern selector switch means for clearing said pattern address counter to an output value within said numerical sequence stored in said address memory but less than said predetermined initial value to which said loading means is effective to reset said pattern address counter.

4. A pattern selection means for a multiple pattern sewing machine as set forth in claim 3 in which a straight stitch pattern is provided by the code words stored in said static pattern memory means addressed by the signals stored at the address delineated by closure of said second operator influenced pattern selector switch means.

5. A pattern selection means for a multiple pattern sewing machine as set forth in claim 3 in which a latch means is provided for maintaining continuous the output of said pattern selection counter to said address memory means, and means for operating said latch means in response to each closure of either of said pattern selector switch means.

6. A pattern selection means for a multiple pattern sewing machine as set forth in claim 1 in which said means effective in response to actuation of said pattern selector switch means for indexing said pattern address counter through said predetermined numerical sequence comprises electrical gate means responsive to each successive closure of said pattern selector switch means for delivering an individual pattern selector counter indexing pulse.

7. A pattern selection means for a multiple pattern sewing machine as set forth in claim 1 in which said means effective in response to actuation of said pattern selector switch means for indexing said pattern address counter through said predetermined numerical sequence comprises a clock pulse generator, means for directing the output from said clock pulse generator to said pattern address counter as indexing pulses thereto, and means rendered effective by continuous closure of said pattern selector switch means for energizing said clock pulse generator.

8. A pattern selection means for a multiple pattern sewing machine as set forth in claim 1 in which said means effective in response to actuation of said pattern selector switch means for indexing said pattern address counter through said predetermined numerical sequence comprises electrical gate means responsive to each successive closure of said pattern selector switch means for delivering individual pattern selector counter indexing pulses, and a clock pulse generator, means for directing the output from said clock pulse generator to said pattern address counter as indexing pulses thereto, and means rendered effective by continuous closure of said pattern selector switch means for energizing said clock pulse generator.

9. A pattern selection means for a multiple pattern sewing machine as set forth in claim 1 in which a display panel is provided on said sewing machine, separate indicia carried on said display panel depicting each stitch pattern selectable by said pattern selection means, and means associated with said display panel for delineating that indicia depicting the stitch pattern rendered selectively effective by said pattern selection means.

* * * * *